United States Patent
Schneider et al.

(10) Patent No.: US 8,523,633 B2
(45) Date of Patent: Sep. 3, 2013

(54) METHOD FOR PRODUCING A SPECTACLE LENS

(75) Inventors: Gunter Schneider, Marburg (DE); Stephan Huttenhuis, Aachen (DE)

(73) Assignee: Schneider GmbH & Co. KG, Fronhausen (DE)

( * ) Notice: Subject to any disclaimer, the term of this patent is extended or adjusted under 35 U.S.C. 154(b) by 992 days.

(21) Appl. No.: 12/449,422

(22) PCT Filed: Feb. 8, 2008

(86) PCT No.: PCT/EP2008/051568
§ 371 (c)(1), (2), (4) Date: Oct. 16, 2009

(87) PCT Pub. No.: WO2008/096007
PCT Pub. Date: Aug. 14, 2008

(65) Prior Publication Data
US 2010/0041318 A1    Feb. 18, 2010

(30) Foreign Application Priority Data
Feb. 8, 2007  (DE) .................... 10 2007 007 006

(51) Int. Cl.
*B24B 1/00*   (2006.01)

(52) U.S. Cl.
USPC ...... 451/42; 451/11; 351/159.01; 351/159.74

(58) Field of Classification Search
USPC ......... 451/11, 42, 43, 63, 384, 390; 351/204, 351/159.01, 159.74
See application file for complete search history.

(56) References Cited

U.S. PATENT DOCUMENTS
6,533,418 B1 * 3/2003 Izumitani et al. ............. 351/204
2003/0090625 A1 * 5/2003 Izumitani et al. ............. 351/204

FOREIGN PATENT DOCUMENTS
DE       38 17 850 A1    12/1989
DE       103 18 597 A1   11/2004

* cited by examiner

*Primary Examiner* — Eileen P. Morgan
(74) *Attorney, Agent, or Firm* — Hudak, Shunk & Farine Co. LPA

(57) ABSTRACT

A method for producing a semi-finished product for a plus or minus power lens having a toroidal or atoroidal back that is configured as a prescription surface. According to the method, a blank having a diameter $D_R$ and a front having a radius of curvature $r_V$ is fixed on its front for the purpose of machining the back and is subjected to cutting, the prescription surface being produced only across a part of the diameter D. Deviating from the curvature of the prescription surface a dimension is left, thereby producing an additional surface, either in the areas of the back in which the generation of the base radius $r_B$ would result in the thickness $h_B$ of the edge being smaller than the minimum dimension $h_{min}$, so that the thickness of the semi-finished product is not smaller than the minimum dimension $h_{min}$ at any point, and the maximum thickness $h_B$ of the edge being five times as large as the thinnest point S of the semi-finished product, or in the areas of the back where the generation of the cylinder radius $r_Z$ would result in the edge being thicker than a thickness $h_B$ of the edge of the semi-finished product in a plane $E_B$ of the base radius $r_B$, the thickness is reduced so that the thickness of the semi-finished product so produced does not exceed the maximum dimension $h_B$ at any point.

24 Claims, 6 Drawing Sheets

METHOD FOR PRODUCING A SPECTACLE LENS

FIELD OF THE INVENTION

The invention is with regard to a process for the manufacture of a semi-finished product for a plus or minus ophthalmic lens with a toric or atoric molded concave rear side that is usually designed as a prescriptive surface, which normally has a cylinder radius $r_Z$ and a base radius $r_B$, starting with a blank that has a diameter $D_R$, a front side that is usually, convex, exhibiting a curvature radius $r_V$, whereby the blank is blocked on the front side for the purpose of machining the rear side for which milling or, preferably, rotating machining is used. The front side of the blank is, as a rule, completely pre-molded and is not machined further, which is why the blank is also called a semi-finished product in prior art. Starting with this molded unprocessed state, the blank is, at least, machined on the rear side. The intermediate state thus achieved after processing the prescriptive surface will henceforth be termed as a semi-finished product. The finished ophthalmic lens is produced from the semi-finished product after polishing, rim machining as well as various coating processes. The atoric mold in particular includes progressive surfaces that comprise continually changing curvatures or a progressive refractive surface. The above-mentioned progressive surfaces are superimposed on the toric mold so that manufacturing methods similar to those for toric surfaces result. The same applies to machining of blanks whose concave rear side is completed. The latter is blocked on the rear side and machined on the front side for the purpose of manufacturing the prescriptive surface.

BACKGROUND OF THE INVENTION

A manufacturing process for an ophthalmic lens is already established in DE 38 17 850 A1. The exact shape of the ophthalmic lens as well as the aperture point and the mounting point relative to a coordinate system for the ophthalmic lens is thus first measured. The cross-section of the ophthalmic lens is then calculated in n-sections with reference to the coordinate system, whereby this calculation is repeated till an optimal ophthalmic lens with a minimal central thickness is calculated in the case of a minimal rim thickness predetermined by the spectacle frame. After aligning and blocking the blank, the ophthalmic lens is then milled, ground and polished corresponding to the previously determined values.

A manufacturing process for ophthalmic lenses is, furthermore, established in DE 103 18 597 35 A1. The semi-finished products in this process are used with optically-effective lens rear sides at which they are blocked on block pieces. The parts are subsequently inserted in the mounting devices by computer numerically controlled machining tools where mechanical machining of the convex lens front side takes place. The work piece is blocked in the case of all mechanical machining processes for the manufacture of the optically-effective convex lens front side. Its round shape, which corresponds to the diameter of the semi-finished product, is thereby retained. Thickness-optimization takes place during mechanical machining and a work piece contour is produced which is formed in such a manner that it gradually inclines downwards, beginning from the center of the work piece and moving outwards, whereby the convex lens front side is formed. This ends in a virtual contour. The curvature direction of the work piece contour reverses from the virtual contour, due to which the work piece contour increases again in the case of further outward progression, whereby a concave, circular supporting rim is formed.

With regard to the methods in accordance with the invention, embodiments in DE 103 18 597 A1, paragraphs 2 to 25 will be referred to explicitly further to prior art and to the background.

The theory in DE 103 18 597 A1 deals, on the one hand, with the problem of thickness, particularly the thickness of the rim of the glasses in accordance with DE 38 17 851 A1. DE 103 18 597 A1 contains a supplemental description for provision of a supporting rim that is attached to a virtual contour of the glass i.e., a virtual rim line of the glass, in order to increase stability in the region of this virtual rim and to increase the quality of surface machining, especially in this virtual rim zone. For this purpose, the theory in DE 103 18 597 A1 dispenses with rim machining of the ophthalmic lens. The diameter remains unchanged. During the entire manufacturing process, the work piece ought to retain the circular shape and the diameter of the semi-finished product so that standardized clamping tools can be used. The curvature of the prescriptive surface is not taken into account when shaping the supporting rim. The prescriptive surface is bordered by the virtual contour and is as large as the required ophthalmic lens.

SUMMARY OF THE INVENTION

The objective of the invention is to provide an improved manufacturing process for ophthalmic lenses.

The objective is met in accordance with the invention in that, due to the size, the prescriptive surface is manufactured only across a part of diameter $D_R$, whereby deviating from the 35 curvature of the prescriptive surface in the regions of the rear side in which the thickness $h_B$ of the rims are thinner than a minimum dimension $h_{min}$ due to generation of the base radius $r_B$, permits a machining allowance so that the thickness of the semi-finished product thus made does not fall below the minimum dimension $h_{min}$ at any point and the thickness $h_B$ of the rim is, at maximum, five times as thick as the thinnest point S of the semi-finished product. Stability of the lens blank in the rim region is ensured across the entire periphery by ensuring the minimum dimension $h_{min}$ of the machining allowance that is subject to the thickness of the semi-finished product. Furthermore, the round shape of the blank can be retained despite optimization of the thickness of the semi-finished product. Machining of the circumference and of the diameter respectively is, as a rule, necessary for the purpose of centering the blocked blank relative to the block piece so that existing imbalances and surface defects at the rim can be removed. Added-on polish machining can take place more precisely and the danger of the rim breaking which could result in sharp edges, can be avoided due to increased stability and rigidity of the machined blank in the rim region. On the whole, the thickness of the blank is, nevertheless, reduced to a minimum even in the region of the machining allowance so that the semi-finished product thus manufactured has the least possible weight.

Machining allowance, which can also be termed as allowance for interference, is created by removal of material at the rim region of the rear side with reference to the prescriptive surface, so that a minimum rim thickness of the semi-finished product is guaranteed. The rear side in this rim region in accordance with the invention is, thus, not removed right up to the prescriptive surface. Machining allowance forms the so-called secondary area which is located at the rim region, i.e. above the prescriptive surface near the rim, and is adjacent to the inner prescriptive surface. The inner prescriptive surface is thereby, usually larger than the required ophthalmic lens. This does not, however, have to be the case. The secondary areas in accordance with the invention can, especially in the case of large ophthalmic lenses, also be a part of the manufactured ophthalmic lens i.e., can form the rim region of the manufactured ophthalmic lens. The ophthalmic lens can, consequently, be designed to be thin in its entirety, whereby, the machining allowance, in accordance with the invention, in the critical rim regions in the area of base radius, is retained in order to ensure a sufficiently thick lens rim. The secondary areas in the rim region and the inner prescriptive surface form, in accordance with the invention, the rear side of the machined, unpolished and round semi-finished product. The extent of the machining allowance is subject to the ratio of the curvature of the front and of the rear side of the semi-finished product.

There is, furthermore, no cutting interruption in the rim region due to the retention of the round shape in the case of a rotating blank, especially during rotary machining so that disadvantages associated with interruptions in cutting are avoided.

In this connection, it can be an advantage to reduce the blank to diameter $D=D_Z$ of the semi-finished product, whereby diameter $D_Z$ is selected in such a manner that a thickness $h_Z$ of the rim of the semi-finished product at level $E_Z$ of the cylinder radius does not exceed the minimum dimension $h_{min}$ required for machining, taking into consideration the size of the prescriptive surface to be generated. The diameter of the blank to be machined, especially for generation of a prescriptive surface, is, in this manner, reduced to a minimum dimension and rim thickness $h_{min}$ is simultaneously ensured while retaining a round shape. Advantages associated with a reduced mass of the blank result from diameter minimization.

Due to the machining allowance provided, in accordance with the invention, in the region of base radius $r_B$, which stretches sickle-shaped, in the case of toric surfaces, in the peripheral direction up to the level of the cylinder radius $r_Z$, i.e., in the peripheral direction by 90° respectively in both directions, the height difference between the cylinder and base radii $r_Z$, $r_B$ is reduced with reference to the axial direction so that, in the case of rotary machining i.e., in the case of the oscillating movement associated therewith during a rotation of the blank, the stroke required for the same is reduced. This is accompanied by an increase of speed during this machining since motors used for the oscillating movement depend upon the extent of the stroke for their maximum stroke frequency. This means that the motors could be operated with a higher frequency when the stroke is small so that a higher speed results in the case of the machined prescriptive surface and, therewith, faster machining of the blank on the whole.

The advantage in this connection could also be that a size between 0.3 mm and 2 mm or 1 mm is pre-set for the minimum dimension $h_{min}$. The minimum dimension ensures the required stability of the lens in the region of the lens rim, on the one hand, and, on the other, ensures that the polishing tool is protected. The rim of the blank does not in itself, consequently, function as a cutting edge.

It can, in addition, be an advantage if thickness $h_B$ of the rim of the semi-finished product does not exceed 2 mm to 6 mm at level $E_B$ of the base radius $r_B$. The semi-finished product thus manufactured, consequently, has the least possible weight. The secondary area and the prescriptive surface should not only merge into one another but should also exhibit the least possible curvature differences so that the tool does not lift off from the prescriptive surface during polishing when moving to and fro on the secondary surface.

For this purpose, it can, in addition, be of advantage that thickness $h_B$ of the rim of the semi-finished product at level $E_B$ of base radius $r_B$ is, at the most, two, three or four times as thick as the thinnest point S of the semi-finished product. These present further dimensions that ensure reduction in the weight of the semi-finished product.

In this connection, thickness of the manufactured semi-finished product in the region of the machining allowance and of the secondary areas being constant and equal to the minimum dimension $h_{min}$ can also be an advantage. The minimum dimension $h_{min}$ preferably deals with the thickness $h_Z$ of the semi-finished product at level $E_Z$ of the cylindrical radius $r_Z$.

In accordance with a further development, an additional possibility could be that a continuous transition or an additional continuous intermediate surface is provided between the prescriptive surface and the secondary area that lies next to the prescriptive surface in a radial direction and has a machining allowance. A constant blending of the prescriptive surface and the secondary areas ensures optimal machining of the rim of the inner prescriptive surface since the rim of the prescriptive surface always lies next to the secondary area, in accordance with the invention. The rim of the prescriptive surface advantageously corresponds to the virtual rim of the ophthalmic lens, depending upon information regarding the ophthalmic lens to he produced and subject to additional dimensions to be provided. Possible effects, such as those that emerge during machining of a rim zone of a lens surface, are thus prevented, on the whole, by the presence of the secondary area bordering the prescriptive surface, Optimal polishing of the prescriptive lens rim zone is possible since the secondary area does not exhibit any curvatures that are essentially smaller than the cylindrical radius. The supportive rim, which has a converse curvature of the surface provided in prior art, would result in lifting of the polishing tool from the prescriptive surface when moving to and fro on the secondary area.

Besides this, it can be an advantage that radial expansion $A_B$ of the secondary area exhibiting a machining allowance in the region of base radius $r_B$ becomes larger than in the region of the cylindrical radius $r_Z$ and/or that expansion $A_B$ is designed to be of varying sizes and/or sickle-shaped along the periphery. The machining allowance is subject to the shape and thickness of the prescriptive surface respectively.

It can, furthermore, be of advantage to have the secondary area exhibiting a curvature radius $r_N$, whereby the curvature radius $r_N$ is smaller than the respective curvature radius of the prescriptive surface. The cylindrical and base radii $r_Z$, $r_B$ are offset at 90° in the case of a toric prescriptive surface that has cylindrical and base radii $r_Z$, $r_B$. The cylindrical and base radii overlap in the region between the two radii with reference to the peripheral direction. An atonic part of the surface is also added to this overlapping, if required. With the exception of the two zones of the cylindrical radius $r_Z$ and the base radius $r_B$, the respective curvature radius $r_B$ of the prescriptive surface is, accordingly, a superimposition of the above-mentioned radii inclusive of a possible tonic part of the surface. Since this deals with so-called. plus lenses in which the cylindrical and base radii $r_Z$, $r_a$ are greater than the basic radius $r_V$ of the blank's front side, this type of blank and this type of lens are each basically thicker in the middle and thin out towards the rim. In order to guarantee the secondary area and the machining allowance respectively, in accordance with the invention, it is necessary that the curvature radius is at least smaller in the transition area than in the prescriptive surface so that the ophthalmic lens thickens again towards the rim in accordance with FIG. 1. Curvature radius $r_N$ is thereby usually smaller than that of the prescriptive surface not only in the transition region but basically in the entire secondary area, which can be contoured according to the curvature radius $r_V$ of the front side or according to the cylindrical radius $r_Z$. The constant transition is advantageous, however, and is to be taken into consideration.

It can also be of advantage that a defined ophthalmic lens shape be provided for the ophthalmic lens to be manufactured, whereby the ophthalmic lens is taken into consideration when calculating diameter D. in the case of the ophthalmic lens the same deals with the subsequent frame i.e., the shape of the completed ophthalmic lens, which then also corresponds to the desired prescriptive surface. During manufacture of an ophthalmic lens that is small, corresponding to the frame, the same can be taken into account during manufacture in accordance with the invention so that the reduction of the blank's diameter, in accordance with the invention, to the effective necessary size of the ophthalmic lens can take place bearing possible safety measures in mind. The secondary areas can thereby be a part of the ophthalmic lens.

Of particular significance for the present invention could be that a plus lens is manufactured from the semi-finished product, whereby thickness $h_M$ in the center of the ophthalmic lens is minimized. Corresponding to the size of the blank minimized, in accordance with the invention, with reference to its diameter, the block piece used can be optimally aligned to its diameter so that maximal support of the round blank is possible. The rim's thickness $h_{min}$, ensured in accordance with the invention, can consequently be optimized in relation to the diameter $D_R$ of the block piece and the required stability of the projecting rim. Thickness $h_M$ in the center of the ophthalmic lens, i.e., the total thickness of the ophthalmic lens, particularly during manufacture of a plus lens, can be reduced when minimizing the diameter in accordance with the invention, whereby the remaining rim thickness $h_M$ can be ensured simultaneously.

For this purpose it could be of advantage that the secondary area be a part of the ophthalmic lens and be in the region of the cylindrical radius $r_Z$ and/or in the region of base radius $r_B$. Thickness of the lens can, consequently, be further optimized. A machining allowance of the secondary area is provided in the critical rim regions in which the rim has become too thin. This is not a disadvantage for the visual impression made when wearing the same, especially in the case of large lenses.

The objective is met in that the prescriptive surface can be manufactured only across a part of diameter $D_B$ due to the size, whereby, deviating from the curvature of the prescriptive surface in the regions of the rear side in which the rim would have become thicker than thickness $h_B$ of the rim of the semi-finished product in level $E_B$ of base radius $r_B$ due to generation of the cylindrical radius $r_Z$, the thickness is reduced so that thickness of the semi-finished product thus generated does not exceed the maximum dimension $h_B$ at any point. The result of this is that the blank and/or the semi-finished product that has been machined in this manner becomes lighter and, above all, flatter in the rim region. The maximal height of the rim and, therewith, the height differences resulting along a periphery are minimized and/or worn down in the rim regions in which the prescriptive surface is not shaped. This results in advantages for the plus lens with regard to the machining frequency of the oscillating cutting tool, The prescriptive surface is thereby either larger than the required size of the ophthalmic lens or, in the case of large ophthalmic lenses, smaller than the desired size of the ophthalmic lens, whereby the secondary area is then a part of the manufactured ophthalmic lens surface. Diameter D is thus aligned and/or calculated to the desired size of the ophthalmic lens.

For this purpose, it can be of advantage that, for the purpose of reduction of diameter, the blank be reduced to diameter $D=D_B$ of the semi-finished product, whereby diameter $D_B$ is selected in such a manner that manufacture of the desired size of the ophthalmic lens (1) is ensured with or without the integrated secondary surface. Deviating from the above description of the method, customization to a previously established ophthalmic lens size and ophthalmic lens shape respectively has most advantages. Minimization of mass and rim height as well as the therewith associated flattening become the greatest advantages.

Reducing the blank's diameter D to $D_{min}$ can be of advantage with reference to the plus and minus ophthalmic lens, whereby $D_{min}$ preferably has a value that is independent of the size of the ophthalmic lens—between 30 mm and 90 mm or 40 mm, 50 min, 60 mm, 70 mm or 80 mm. If the desired ophthalmic lens falls below a specific basic size such as, for example, 30 mm, then the blank's diameter is standardized to a greater dimension, in accordance with the invention, if it does not already exhibit the same. The secondary and transition areas next to the prescriptive surface are, therewith, somewhat larger. In the case of plus lenses, the secondary area maintains the required minimum thickness i e., the machining allowance is taken into consideration so that the blank to be machined does not become too thin and remains round. In the case of minus lenses, the transition area is restricted to the maximum required thickness dimension so that the blank is round and lighter. This results in a flattening of the rim regions adjacent to the prescriptive surface in both cases and in the advantages described above associated therewith.

For this purpose it can be an advantage to have a continuous transition or an intermediate surface between the prescriptive surface and the transition area formed by the deviation from the prescriptive surface.

It could also be beneficial to have the thickness of the manufactured semi-finished product in the region of the transition area constant and equal to the maximum dimension $h_B$.

It could also be advantageous to have the radial expansion $A_Z$ of the transition area become larger in the region of the cylindrical radius $r_Z$ than in the region of base radius $r_B$ and that expansion $A_Z$ is designed to be of varying size and/or sickle-shaped along the periphery.

In addition to this, it can be an advantage to have the transition area exhibit a curvature radius $r_U$, whereby the curvature radius $r_U$ is greater than the respective curvature radius $r_R$ of the prescriptive surface. The continuous transition ensures the same advantages as above with regard to plus ophthalmic lenses, as detailed already. Raising and/or lifting of the polishing tool during polishing is avoided in particular. The polishing tool has a partial diameter that is 25% to 50% of the blank's and/or semi-finished product's diameter so that the round curvature established in prior art prevents a desired polishing pressure of the polishing tool in the rim region of the prescriptive surface.

In the process, it can advantageously be seen that a minus lens is manufactured from the semi-finished product, whereby the thickness $h_M$ in the center of the ophthalmic lens is optimized. Correspondingly, for a minus lens to a plus lens, the rim thickness is to be minimized and thickness $h_M$ in the center is to be optimized.

For this purpose it could be of advantage to have the transition area as a part of the ophthalmic lens and provided in the region of cylindrical radius $r_Z$ and/or in the region of base radius $r_B$. The rim thickness of the ophthalmic lens is designed to be thinner, deviating from the thickness pre-specified by the cylindrical radius and/or the base radius.

According to this, the prescriptive surface of the ophthalmic lens ends at the border of the transition area.

The objective is also met by a process to manufacture a plus ophthalmic lens in which a blank with diameter $D_B$ with a first side that has a curvature radius $r_V$ is blocked on the first side for the purpose of machining the second side and is subject to cutting, whereby the blank and the semi-finished product is rotary machined and the round shape retained for the blank and the semi-finished product, whereby, for the purpose of optimization of the thickness of a rim of the semi-finished product and of the ophthalmic lens, a secondary area exhibiting machining allowance is provided. Consequently, disadvantages of a too-thin rim associated with an optimized ophthalmic lens despite retention of the round shape are avoided.

BRIEF DESCRIPTION OF THE DRAWINGS

Other advantages and details of the invention are explained in the patent claims and in the description and are illustrated in the figures.

DETAILED DESCRIPTION OF THE INVENTION

Figure 1:
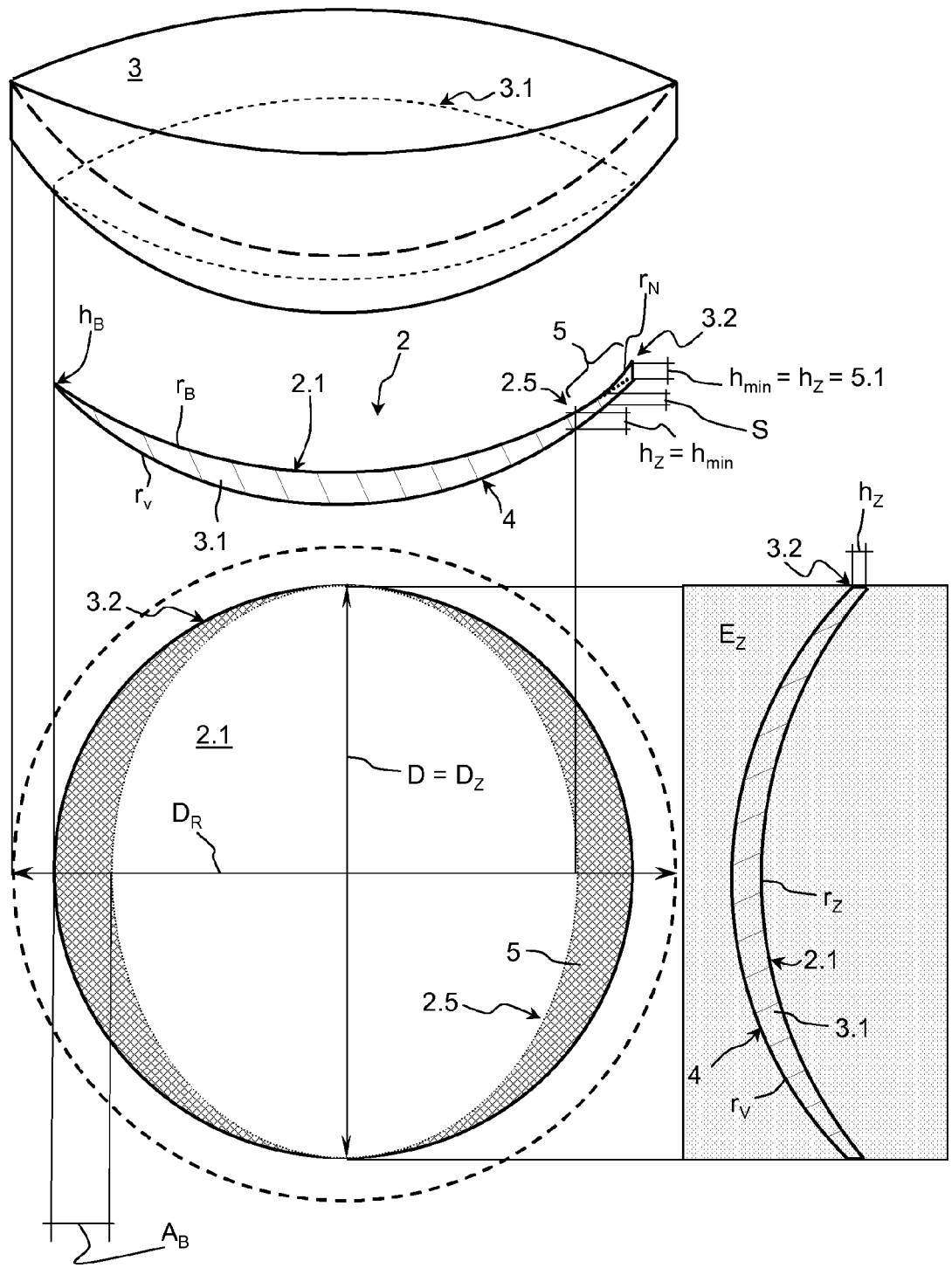
FIG. 1 presents a perspective view of a blank 3 for plus lenses as well as a top view, including the sectional illustration with reference to the base and cylindrical radii, $r_B$, $r_Z$.
Figure 2:
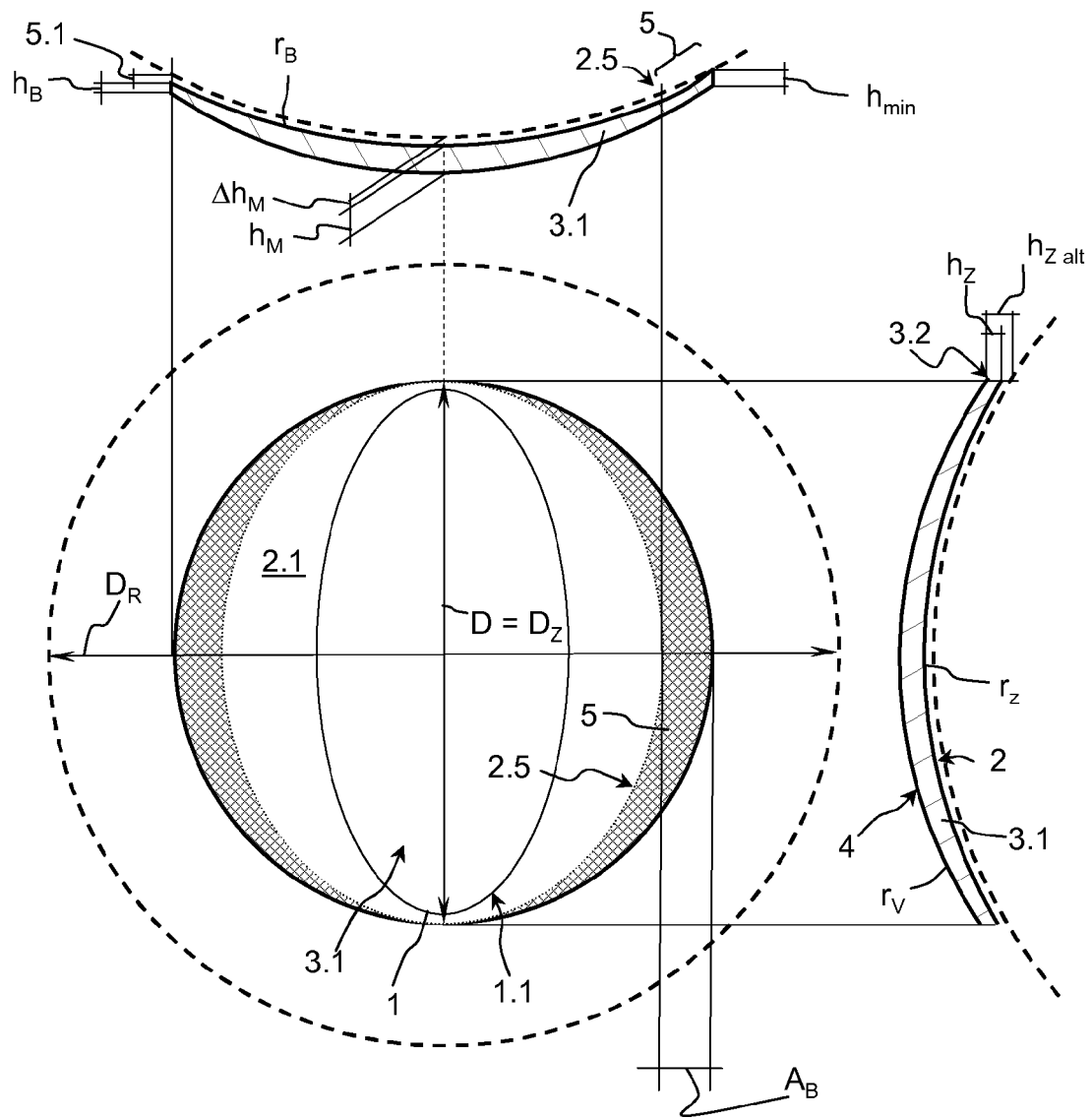
FIG. 2 is a top view, in accordance with FIG. 1, of a downscaled design with a sketched ophthalmic lens.
Figure 3:
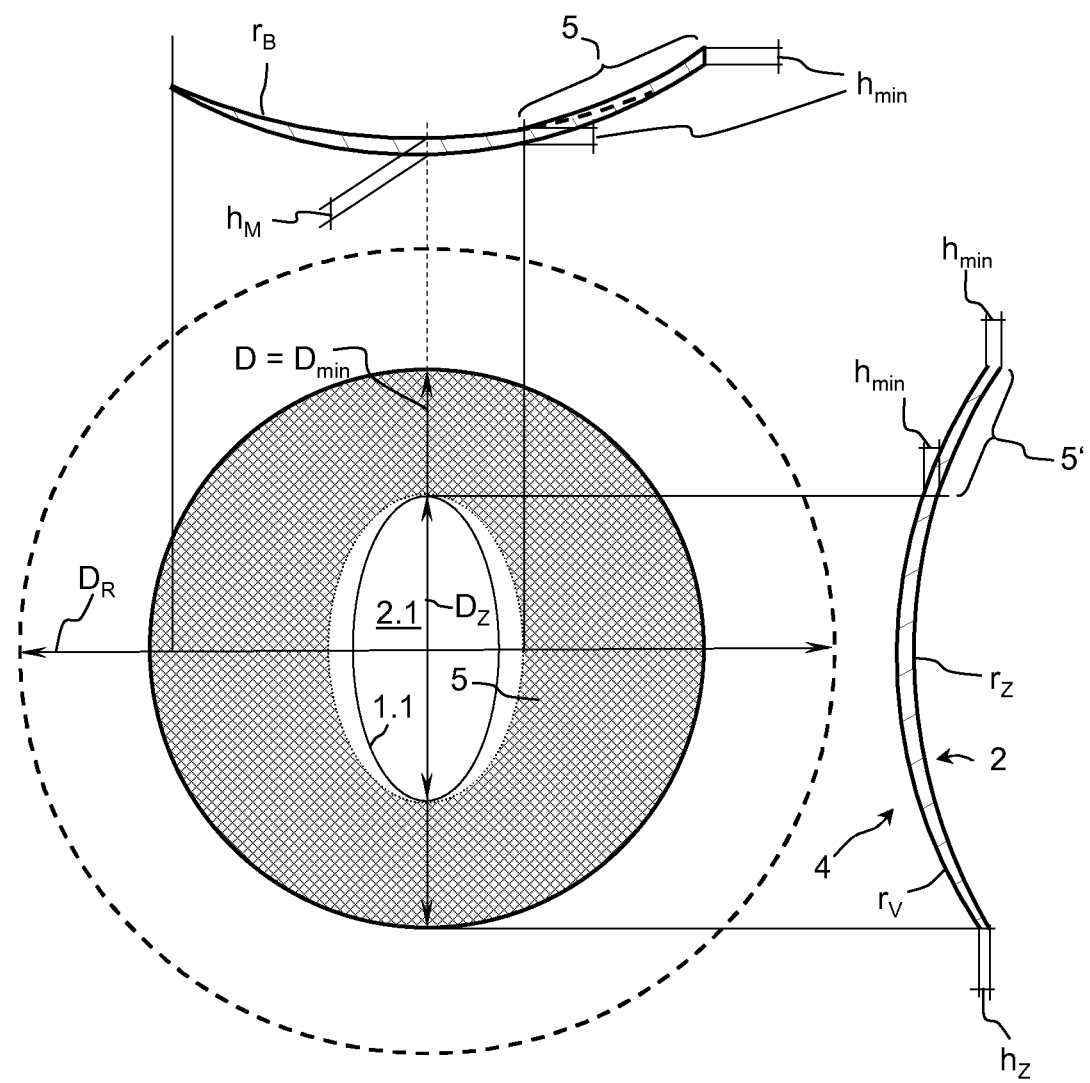
FIG. 3 is a top view, in accordance with FIG. 1, of a downscaled design of an ophthalmic lens.

FIG. 1 presents a top perspective of blank 3 from which a semi-finished product 3.1 is manufactured by rotary machining a rear side 2, said blank exhibiting a pre-formed concave front side 4 by which the blank is located, for the purpose of machining, over a block piece 6 as well as a block device 6.1 in a holding device that is not illustrated in FIG. 3. The shape of the semi-finished product 3.1 is sketched within the perspective illustration of blank 3 and is sketched in accordance with a top view in FIG. 1, and/or in accordance with the respective right and upper sectional illustration. Semi-finished product 3.1 results from rotary machining of blank 3 for the purpose of manufacturing a lens 1 and/or an ophthalmic lens 1, as sketched in FIG. 2.

Based on diameter $D_R$ sketched in the top view, blank 3 is reduced to diameter $D_2$, whereby blank 3 and the, consequently, at least partially manufactured semi-finished product 3.1 exhibit a thickness and/or height $h_Z$ in a rim region 3.2 after machining the concave rear side 2 and 25 after generating a prescriptive surface 2.1 respectively, taking into consideration the cylindrical radius $r_Z$ to be created in accordance with the sectional illustration on the right side. Height $h_Z$ corresponds to height $h_{min}$, and ensures stability of rim 3.2 in the subsequent machining steps, especially polishing, so that distortion of rim 3.2 or breaking off of rim 3.2 is prevented.

In the case of toric surfaces a base radius $r_B$, located offset by 90°, in accordance with the upper sectional illustration, is allocated to the respective cylindrical radius $r_Z$. Since base radius $r_B$ and the cylindrical radius $r_Z$, especially in the case of the plus lenses presented here, are larger than a curvature radius $r_V$ of the front side 4, the cross-section of lens 1 tapers from the center towards the outside in accordance with the sectional illustration. Since base radius $r_B$ is also larger than the cylindrical radius $r_Z$, the semi-finished product 3.1 would become flatter at rim 3.2 at level $E_B$ of base radius $r_B$ and/or taper off to a point i.e., exhibit a very marginal thickness $h_B$, as illustrated in the upper sectional illustration on the left side. In accordance with the upper sectional illustration on the right side, this tapering shape with thickness $h_B$ is presented with dashes. A machining allowance 5.1 and/or secondary area 5 formed by the machining allowance, in accordance with the invention, is provided in this critical rim region 3.2, starting from rim 2.5 of the prescriptive surface 2.1 at which thickness $h_{min}$ is still ensured so that thickness $h_{min}$ is provided at rim 3.2. According to this, thickness $h_{min}$ does not deviate further, starting from rim 2.5 of the prescriptive surface 2.1 up to rim 3.2. Starting from the base radius $r_B$ of the prescriptive surface 2.1 to be actually generated, an additional secondary area 5 that exhibits machining allowance 5.1 is left consequently in rim region 3.2, adjacent to the prescriptive surface 2.1, said machining allowance exhibiting thickness $h_{min}$ at rim 3.2 in the exemplary embodiment. Based on the thickness of the semi-finished product 3.1 at the rim of the prescriptive surface 2.1, thickness of the semi-finished product 3.1 in the transition area towards the secondary area 5 can be less than thickness $h_{min}$ at rim 3.2 due to the formation of the curvature radius of the secondary area 5. A thinnest point S of the semi-finished product 3.1 is generated in this manner. In the best case, secondary area 5 exhibits a constant thickness $h_{min}$ that is equal to thickness $h_Z$ at rim 3.2. The thinnest point S is then the secondary area 5 with diameter $h_{min}$.

The transition between the prescriptive surface 2.1 and the secondary area 5 thus presents the oval-shaped rim 2.5 of the inner prescriptive surface as a border to the secondary area 5 and/or the consequently covered outer prescriptive surface. The transition between the prescriptive surface 2.1 and the secondary area 5 is preferably continuous, whereby a basic radius $r_N$ of 25 secondary area 5 is usually smaller than basis radius $r_B$ and/or the respective radius of the prescriptive surface 2.1 resulting due to overlapping of the base and cylindrical radii $r_B$, $r_Z$. The transition between the prescriptive surface 2.1 and the secondary surface 5 can also be shaped in the form of an additional transition area in order to ensure continuity of the surface.

In accordance with a top view in FIG. 1, the secondary area 5 thus generated is sickle-shaped, said shape resulting from the overlapping of the circular rim 3.2 of the semi-finished product 3.1 with the prescriptive surface rim 2.5. Radial expansion $A_B$ of secondary area 5 varies along the periphery and is at the maximum in the region of base radius $r_B$. Machining allowance 5.1 consequently results based on thickness of $h_{min}$–$h_B$ the semi-finished product 3.1 present at level $E_B$ of base radius $r_B$, the extent of the machining allowance to level $E_Z$ of cylindrical radius $r_Z$ reducing constantly.

The semi-finished product 3.1 thus formed has a circular shape with a sufficiently large diameter $D_Z$ which ensures optimal further machining in this respect of any prescriptive surface 2.1 of the semi-finished product 3.1 up to the completed ophthalmic lens 1 in accordance with FIG. 2. The size of the ophthalmic lens 1 is, however, restricted to diameter $D_Z$.

Based on the semi-finished product 3.1 illustrated in FIG. 1 and rim thickness $h_Z$ and $h_{min}$ respectively illustrated therein, the desired shape 1.1 of an ophthalmic lens 1 is to be taken into consideration in accordance with FIG. 2.

Shape 1.1 of the ophthalmic lens 1 is significantly smaller than the shape of the semi-finished product 3.1 in accordance with FIG. 1. Accordingly, diameter $D_R$ of blank 3 can be further reduced significantly to diameter $D_Z$ required for ophthalmic lens 1. Due to the further reduction of diameter $D_Z$ and due to the converging characteristic of curvature radius $r_V$ of front side 4 and of the cylindrical radius $r_Z$, a significantly higher rim thickness $h_{Zalt}$ results in accordance with the right sectional illustration which, however, on the whole, results in a thicker and, therewith, heavier ophthalmic lens 1. According to this, the desired rim thickness $h_Z$ is taken into consideration when generating cylindrical radius $r_Z$ so that the semi-finished product 3.1 turns out to be thinner as a result of taking the shape of the spectacles and/or of the ophthalmic lens 1.1. on the whole and the thickness $h_M$ in the center into consideration, particularly by dimension $\Delta h_M$.

In accordance with the upper sectional illustration in FIG. 2, secondary area 5 is provided correspondingly in the right rim region so that rim height $h_{min}$ does not fall below the desired minimum dimension, especially thickness $h_Z$. Rim height $h_B$ that actually results and is illustrated for elucidation on the left side of the upper sectional illustration, is, without generation of the machining allowance 5.1 in accordance with the invention, significantly smaller than the desired minimum rim height $h_{min}$.

Thickness $h_M$, achievable in the center of the semi-finished product 3.1 thus formed, is reduced by maximal reduction of diameter $D_Z$ to dimension $h_M$, taking into consideration a maximal permissible rim height $h_Z$, whereby reduction of thickness by $\Delta h_M$ in the center of the lens is achieved based on the exemplary embodiment in FIG. 1.

In the process according to the exemplary embodiment in FIG. 3, the blank 3 and the semi-finished product 3.1 respectively were left with diameter size $D=D_{min}$, whereby this minimum diameter $D_{min}$ is larger than the diameter required for ophthalmic lens shape 1.1. Ophthalmic lens shape 1.1 deals with a relatively small ophthalmic lens shape 1.1, the handling of which would have been very difficult due to a correspondingly small blank 3 and semi-finished product 3.1 respectively. Blank 3 has, therefore, been left with minimum diameter $D_{min}$. Since this also deals with a plus ophthalmic lens 1, machining allowance 5.1 in accordance with the invention has been left in rim region 3.2 in order to ensure rim thickness $h_{min}$ corresponding to the above-described exemplary embodiments, whereby machining allowance 5.1 in this case occupies an essentially larger surface portion of the semi-finished product 3.1 than in the case according to exemplary embodiments 1 and 2 in which the semi- finished product 3.1 and its diameter D respectively correspond approximately to the expected diameter and to the size of the ophthalmic lens shape 1.1 respectively.

In accordance with the upper sectional illustration in FIG. 3, the semi-finished product 3.1 was allowed to taper to a point due to the pre-requisite of an optimized central lens thickness $h_M$ and/or the minimum diameter $D_{min}$ could not be exhibited at least with reference to level $E_B$ of base radius $r_B$. In accordance with a right sectional illustration, at least the height $h_Z$ of the rim at level $E_Z$ of the cylindrical radius $r_Z$ was achieved, as can be seen at the lower end of the illustration. This height $h_Z$ would, nevertheless, be less than the minimum dimension $h_{min}$ whereby according to the upper end of the right sectional illustration, a corresponding secondary area 5' with a S machining allowance 5.1' is provided in rim region 3.2 which ensures rim height $h_{min}$.

Figure 4:
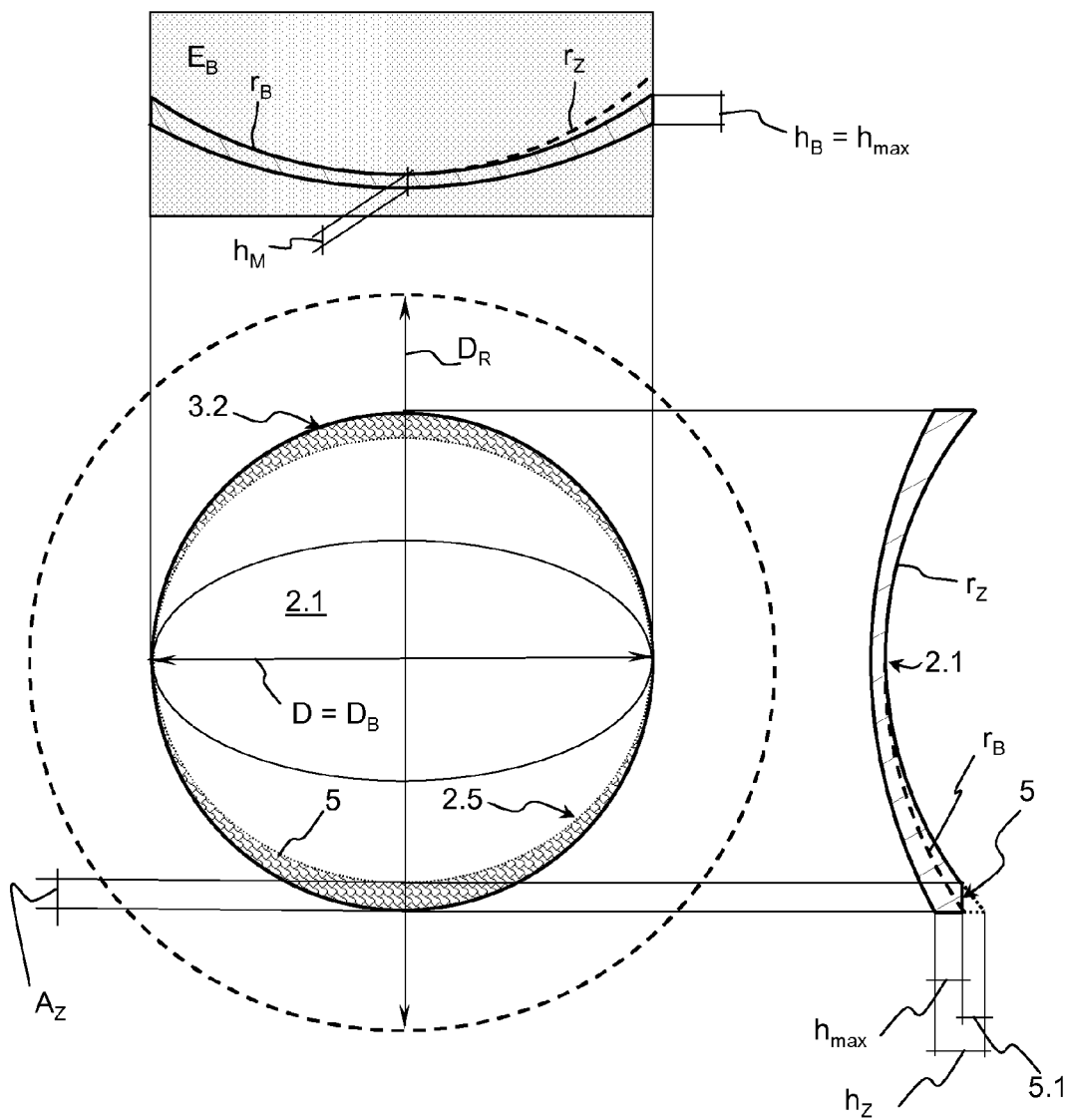
FIG. 4 illustrates, in accordance with FIG. 1, a minus lens with a sketched ophthalmic lens.

The technique for a minus lens 1 is presented in the exemplary embodiment illustrated in FIG. 4, in accordance with the invention. Starting from thickness $h_M$ of the semi-finished product 3.1 in the center, the semi-finished product 3.1 becomes thicker towards rim 3.2 due to the curvature ratios of the curvature radius $r_V$ of the front side and of the cylindrical and base radii $r_Z$, $r_B$.

The semi-finished product 3.1 is reduced to a size that matches the size of the ophthalmic lens shape 1.1, whereby diameter $D_B$ is related to the rim thickness which results at level $E_B$ of base 35 radius $r_B$, i.e., rim thickness $h_B$ in accordance with the upper sectional illustration. Height $h_B$ thereby represents the largest desired rim thickness since, deviating from level $E_B$ of base radius $r_B$, rim height $h_B$ increases continuously right up to a rim height $h_Z$ at level $E_Z$ of cylindrical radius $r_Z$, in accordance with the right sectional illustration.

A minus allowance 5.1 is provided for the purpose of minimization of mass, on the one hand, and for the purpose of equalizing the rim height, on the whole, along the periphery and that part of the semi-finished product 3.1 that extends over rim height $h_B$ is cut off and a transition area 5 consequently generated adjacent to the prescriptive surface 2.1. The transition between the prescriptive surface 2.1 and the transition surface 5 is discontinuous according to the illustration in FIG. 4 i.e., an edge is present within the entire surface. Advantageously, a continuous transition, which would, however, bring about a height difference between thickness $h_B$ and emerging thickness $h_{max}$ of the transition area 5, is to be provided at this point.

In accordance with the top view presented in FIG. 4, the transition area 5 thus generated exhibits a sickle shape which results from superimposing the prescriptive surface rim 2.5 on the circular rim 3.2 of the semi-finished product 3.1. The radial expansion $A_Z$ of transition area 5 varies along the periphery and is at a maximum in the region of the cylindrical radius $r_Z$.

Figure 5:
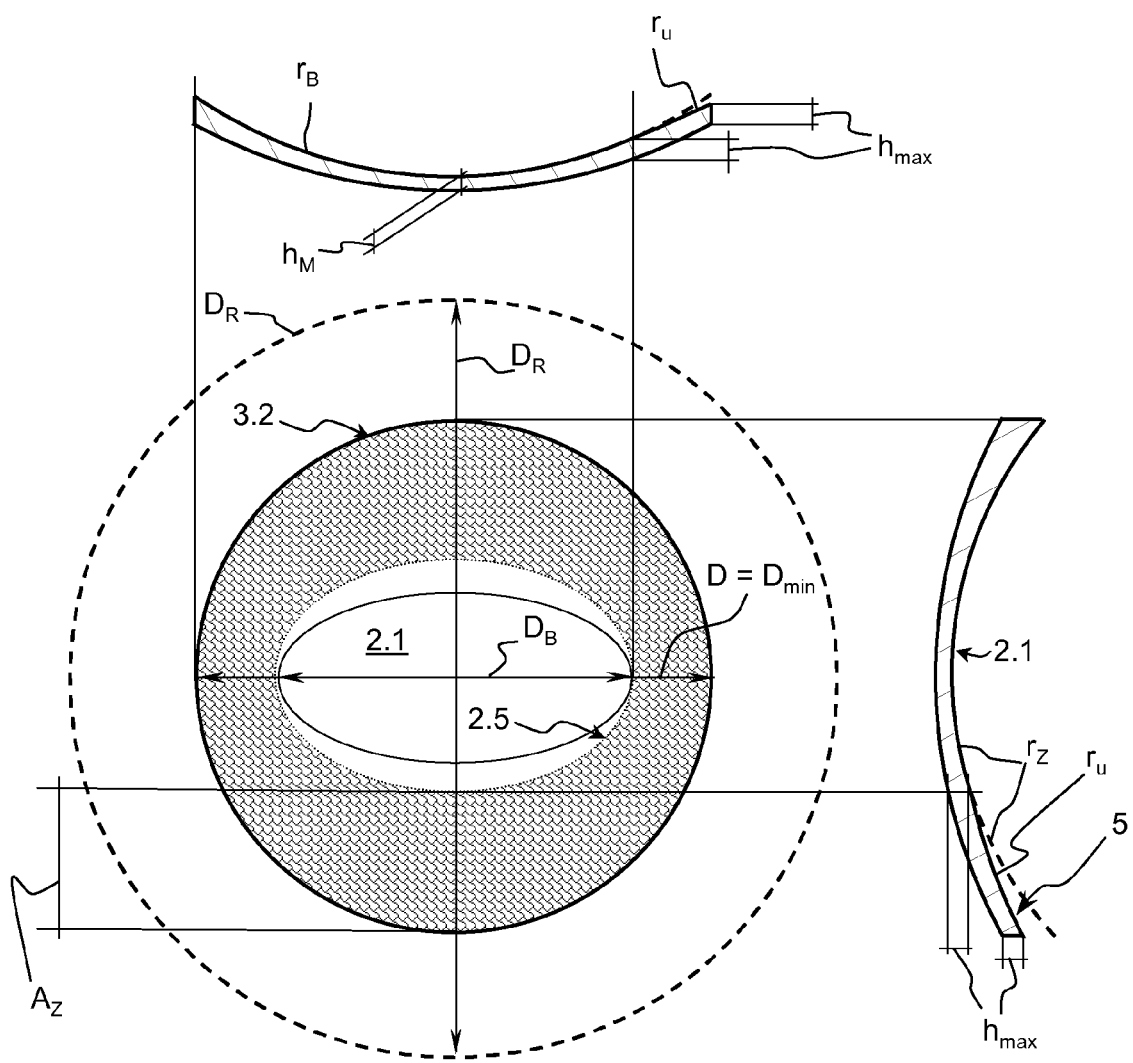
FIG. 5 illustrates, in accordance with FIG. 1, a downscaled design of a minus lens with a sketched ophthalmic lens.

Blank 3 is to be left at a minimum diameter of $D_{min}$ in accordance with exemplary embodiment 20 in FIG. 5 for minus lenses also if the ophthalmic lens 1 to be manufactured becomes significantly smaller. The resulting transition area 5, which is adjacent to the prescriptive surface 2.1, thus extends from rim 2.5 of prescriptive surface 2.1 up to rim 3.2 of the semi-finished product 3.1 Resulting rim height and/or rim thickness due to the minimum diameter $D_{min}$ is reduced to a maximum dimension $h_{max}$, according to an upper and right sectional 25 illustration, whereby a continuous transition is provided in the region of the prescriptive surface rim 2.5 between transition area 5 and the prescriptive surface 2.1.

Figure 6:
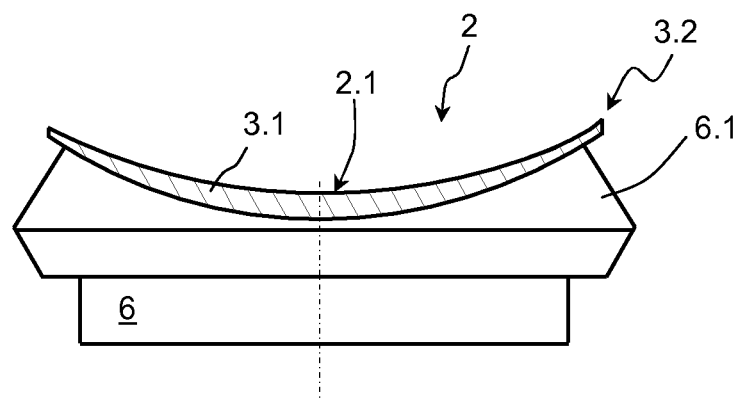
FIG. 6 presents a section of the semi-finished product with block pieces and block devices.

In FIG. 6, blank 3 and/or the semi-finished product 3.1 and, subsequently, the completed lens 1, are held by block piece 6 and block device 6.1 in a holding device that is not illustrated. With regard to the diameter of lens 1 resulting at the front side 4, block device 6.1 is aligned and/or oriented to rim 3.2 due to the predetermined diameter of block piece 6 and taking into account diameter D that has been minimized in accordance with the invention as well as the shape of the ophthalmic lens 1.1.

Figure 7:
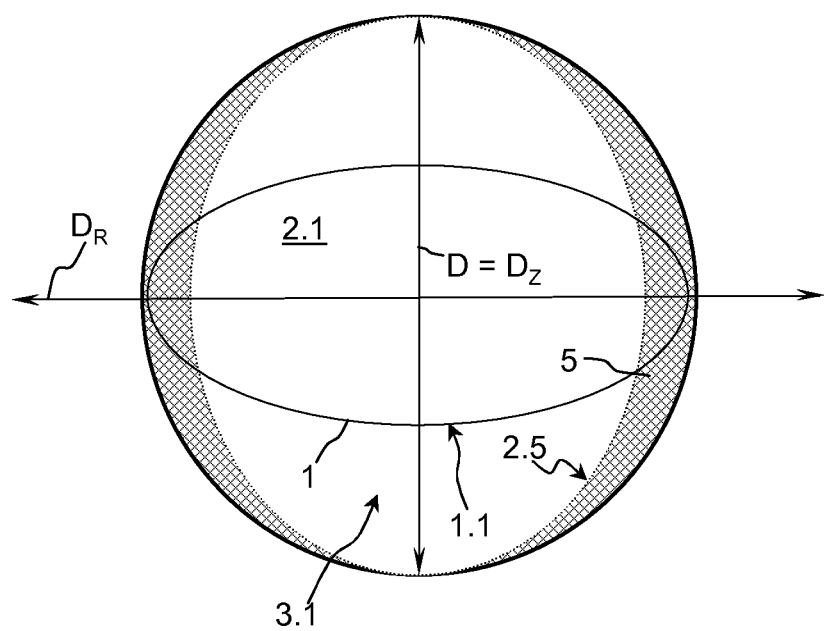
FIG. 7 presents the semi-finished product, in accordance with FIG. 2, with a ophthalmic lens sketched in varied positions.

In accordance with the exemplary embodiment in FIG. 7, the secondary or transition area 5 is part of the ophthalmic lens 1 and is provided at the rim region where the thickness of the rim would be disadvantageous due to optimization of the lens thickness.

In the added-on processing steps, the semi-finished product 3.1 and/or the prescriptive surface 2.1 thus formed is polished and the rim area milled for the purpose of fastening the ophthalmic lens 1 thus formed. Rotary machining that is used exclusively to manufacture the semi-finished product 3.1 is sufficient because the round shape of the semi-finished product 3.1 is retained. The secondary area 5, in accordance with the invention, is furnished with a machining allowance 5.1 if the rim thickness becomes critical, especially too thin, so that the round shape can be retained.

LIST OF REFERENCE SIGNS

1. Ophthalmic lens, lens, plus lens, minus lens
1.1 Ophthalmic lens shape
2. Rear side
2.1 Prescriptive surface
2.5 Rim of the prescriptive surface, prescriptive surface rim
3. Blank
3.1 Semi-finished product
3.2 Rim, rim region
4. Front side
5. Adjacent area, transition area
5' Adjacent area
5.1 Machining allowance, minus allowance
5.1' Machining allowance
6. Block piece
6.1 Block devices
$A_B$ Breadth of the adjacent area
D Diameter of the blank, reduced
$D_B$ Diameter of the blank, reduced
$D_{min}$ Minimum diameter of blank, semi-finished product
$D_R$ Diameter of blank, original
$D_Z$ Diameter of blank, reduced
$E_B$ Level of base radius
$E_Z$ Level of cylindrical radius
$h_B$ Thickness and height respectively of rim at the level of the base radius
$h_{max}$ Maximum diameter
$h_{min}$ Minimum diameter for the thickness and height respectively of the rim
$h_M$ Thickness and height respectively in the middle
$h_Z$ Thickness/height of rim at the level of the cylindrical radius
$h_{Zalt}$ Rim thickness, old
$r_B$ Base radius
$r_N$ Curvature radius of the adjacent area
$r_U$ Curvature radius of the transition area
$r_V$ Curvature radius of the front side, basic curvature
$r_Z$ Cylindrical radius

The invention claimed is:

1. A process for the manufacture of a semi-finished product from a blank, the semi-finished product for a plus ophthalmic lens with a toric or atoric concave rear side that is designed as a prescriptive surface, comprising the steps of:
   a) blocking a blank on the front side for the purpose of machining the rear side for generating the prescriptive surface, and wherein the blank has a diameter $D_R$ and a front side that has a curvature radius $r_V$; and
   b) manufacturing the prescriptive surface only across a part of a diameter D where $D<D_R$, whereby in the regions of the rear side in which a thickness $h_B$ of a rim would become smaller than a minimum dimension $h_{min}$ due to generation of a base radius $r_B$, a deviation from the curvature of the prescriptive surface is applied that leaves an allowance thus creating a secondary rim area so that the thickness of the resulting manufactured semi-finished product formed from the blank is not less than the minimum dimension $h_{min}$ at any point, and wherein the thickness $h_B$ of the rim is, at a maximum, five times as large as a thinnest point S of the semi-finished product; and
   c) unblocking the semi-finished product, following optional further processing.

2. The process according to claim 1, wherein the blank is reduced to a diameter $D=D_Z$ of the semi-finished product, whereby the diameter $D_Z$ is selected in such a manner that, taking the size of the prescriptive surface into consideration, a thickness $h_Z$ of the rim of the semi-finished product in a level $E_Z$ of the cylindrical radius $r_Z$ does not fall below the minimum dimension $h_{min}$ required for handling.

3. The process according to claim 1, wherein a dimension between 0.3 mm and 2 mm is predetermined for minimum dimension $h_{min}$.

4. The process according to claim 1, wherein the thickness $h_B$ of the rim of the semi-finished product at level $E_B$ of the base radius $r_B$ does not exceed 2 mm to 6 mm.

5. The process according to claim 4, wherein the thickness $h_B$ of the rim of the semi-finished product at level $E_B$ of the base radius $r_B$ becomes three of four times thicker than the thinnest point S of the semi-finished product.

6. The process according to claim 1, wherein in the area of the allowance the thickness of the manufactured semi-finished product is constant and equal to the minimum dimension $h_{min}$.

7. The process according to claim 1, wherein a continuous transition is provided between the prescriptive surface and the secondary area exhibiting the machining allowance.

8. The process according to claim 1, wherein a radial expansion $A_B$ of the secondary area formed by the machining allowance is greater in the region of the base radius $r_B$ than in the region of the cylindrical radius $r_Z$.

9. The process according to claim 8, wherein the expansion $A_B$ is of varying dimensions or is sickle shaped along the periphery, or is both of varying dimensions and sickle shaped along the periphery.

10. The process according to claim 1, wherein the secondary area has a curvature radius $r_N$, whereby the curvature radius $r_N$ is smaller than the curvature radius of the prescriptive surface.

11. The process according to claim 1, wherein a defined ophthalmic lens rim shape is provided for the ophthalmic lens to be manufactured, whereby the ophthalmic lens rim shape is taken into consideration when calculating the diameter D.

12. The process according to claim 1, wherein a plus lens is manufactured from the semi-finished product, whereby a thickness $h_M$ is minimized in the center of the ophthalmic lens.

13. The process according to claim 12, wherein the secondary area is a part of the ophthalmic lens and is provided in the region of the cylindrical radius $r_Z$ or in the region of the base radius $r_B$, or both in the region of the cylindrical radius $r_Z$ and the region of the base radius $r_B$.

14. The process according to 1, wherein the blank is reduced to diameter $D=D_{min}$, whereby $D_{min}$ has a value between 30 mm and 90 mm.

15. The process according to claim 1, further including
    rotary machining the blank into a semi-finished product, and
    retaining a round shape from the blank to the semi-finished product.

16. A process for the manufacture of a semi-finished product from a blank, the semi-finished product for a minus ophthalmic lens with a toric or atoric rear side that is designed as a prescriptive surface comprising the steps of:
    a) blocking a blank on the front side for the purpose of machining the rear side for generating the prescriptive surface, and wherein the blank has a diameter $D_R$, with a front side that has a curvature radius $r_V$, and
    b) manufacturing the prescriptive surface only across a part of a diameter D where $D<D_R$, whereby, deviating from a curvature of the prescriptive surface in the regions of the rear side in which, due to generation of the cylindrical radius $r_Z$, a rim would become thicker than a thickness $h_B$ of the rim of the semi-finished product at level $E_B$ of base radius $r_B$, the thickness is reduced so that the thickness of the resulting semi-finished product thus formed from the blank does not exceed a maximum dimension $h_B$ at any point; and c) unblocking the semi-finished product, following optional further processing.

17. The process according to claim 16, wherein the blank is reduced to diameter $D=D_B$ of the semi-finished product, whereby the diameter $D_B$ is selected in such a manner that the manufacture of a desired size of the ophthalmic lens is ensured.

18. The process according to claim 16, wherein a continuous transition is provided between the prescriptive surface and a secondary area formed by the deviation from the prescriptive surface.

19. The process according to claim 18, wherein the thickness of the manufactured semi-finished product is constant and equal to the maximum dimension $h_B$ in the region of the secondary area.

20. The process according to claim 19, wherein radial expansion $A_B$ of the transition area becomes larger in the region of a cylindrical radius $r_Z$ than in the region of a base radius $r_B$.

21. The process according to claim 20, wherein expansion $A_B$ is of varying dimension or sickle-shaped along the periphery, or both varying dimension and sickle-shaped along the periphery.

22. The process according to claim 18, wherein the transition area has a curvature radius $r_U$, whereby the curvature radius $r_B$ is greater than the respective curvature radius of the prescriptive surface.

23. The process according to claim 16, wherein a minus lens is manufactured from the semi-finished product, whereby thickness $h_M$ is optimized in the center of the ophthalmic lens.

24. The process according to claim 23, wherein a transition area is a part of the ophthalmic lens and is provided in the region of a cylindrical radius $r_Z$ or in the region of a base radius $r_B$, or both in the region of a cylindrical radius $r_Z$ and in the region of a base radius $r_B$.

* * * * *

UNITED STATES PATENT AND TRADEMARK OFFICE
CERTIFICATE OF CORRECTION

PATENT NO. : 8,523,633 B2  
APPLICATION NO. : 12/449422  
DATED : September 3, 2013  
INVENTOR(S) : Gunter Schneider and Stephan Huttenhuis It is certified that error appears in the above-identified patent and that said Letters Patent is hereby corrected as shown below:

In the Specification

Column 4, line 50, replace "atonic" with --atoric--

Column 4, line 55, replace "tonic" with --toric--

Column 4, line 57, replace "$r_a$" with --$r_B$--

Column 5, line 8, replace "in" with --In--

Column 6, line 16, replace "50 min" with --50 mm--

Signed and Sealed this  
Fourth Day of February, 2014

Michelle K. Lee  
*Deputy Director of the United States Patent and Trademark Office*